United States Patent
Khakpour et al.

(10) Patent No.: US 9,736,059 B2
(45) Date of Patent: Aug. 15, 2017

(54) PURGING FAILOVER THROUGH APPLICATION CONTROLLED TRANSIT SELECTION

(71) Applicant: Verizon Digital Media Services Inc., Playa Vista, CA (US)

(72) Inventors: Amir Reza Khakpour, Los Angeles, CA (US); Derek Shiell, Los Angeles, CA (US)

(73) Assignee: Verizon Digital Media Services Inc., Los Angeles, CA (US)

( * ) Notice: Subject to any disclaimer, the term of this patent is extended or adjusted under 35 U.S.C. 154(b) by 0 days.

(21) Appl. No.: 15/066,862

(22) Filed: Mar. 10, 2016

(65) Prior Publication Data

US 2016/0294678 A1    Oct. 6, 2016

Related U.S. Application Data

(63) Continuation-in-part of application No. 14/679,266, filed on Apr. 6, 2015.

(51) Int. Cl.
| | |
|---|---|
| H04L 12/28 | (2006.01) |
| H04L 12/56 | (2006.01) |
| H04L 12/707 | (2013.01) |
| H04L 12/721 | (2013.01) |
| H04L 12/741 | (2013.01) |

(52) U.S. Cl.
CPC ............. *H04L 45/22* (2013.01); *H04L 45/70* (2013.01); *H04L 45/74* (2013.01)

(58) Field of Classification Search
None
See application file for complete search history.

(56) References Cited

U.S. PATENT DOCUMENTS

| | | | |
|---|---|---|---|
| 2011/0249659 A1* | 10/2011 | Fontaine | H04L 1/1607 370/338 |
| 2012/0023178 A1* | 1/2012 | Drevon | H04L 12/1895 709/206 |
| 2014/0195686 A1* | 7/2014 | Yeager | H04L 67/1023 709/226 |
| 2016/0248663 A1* | 8/2016 | Patel | H04L 45/12 |

* cited by examiner

*Primary Examiner* — Edan Orgad
*Assistant Examiner* — Rebecca Song
(74) *Attorney, Agent, or Firm* — Los Angeles Patent Group; Arman Katiraei

(57) ABSTRACT

Some embodiments provide redundancy and failover for accelerating and improving the processing of commands across a distributed platform. A distributed platform administrative server distributes commands to different distributed platform points-of-presence (PoPs) for execution. The administrative server distributes the commands over a first set of transit provider paths that connect the server to each PoP. The administrative server selects the first set of paths based on different addressing associated with each of the paths. If any of the first paths is unavailable or underperforming, the administrative server selects a second path by changing a destination address and resends the command to the particular PoP over the second path. Some embodiments further modify PoP server operation so that the PoP servers can identify commands issued according to the different path addressing and distribute such commands to all other servers of the same PoP upon identifying the different path addressing.

20 Claims, 9 Drawing Sheets

PURGING FAILOVER THROUGH APPLICATION CONTROLLED TRANSIT SELECTION

CLAIM OF BENEFIT TO RELATED APPLICATIONS

This application is a continuation-in-part of U.S. nonprovisional application Ser. No. 14/679,266, entitled "Application Controlled Path Selection Over Different Transit Providers", filed Apr. 6, 2015. The contents of application Ser. No. 14/679,266 are hereby incorporated by reference.

BACKGROUND ART

Efficiency and performance is a differentiating factor for content delivery networks (CDNs) or other distributed platforms that operate different points-of-presence (PoPs) with each PoP hosting a different set of servers at a different network location or geographic region. One area where distributed platform performance can be greatly impacted is in the performance of tasks that are distributed across multiple distributed platform servers for execution. Completion of such tasks is dependent on the weakest link of the distributed platform.

Distribution and execution of a purge command within a distributed platform illustrates distributed platform performance degradation that can result from just one weak link in the distributed platform. To purge content across the distributed platform, a distributed platform administrative server sends a purge command to the distributed platform content delivery servers that are deployed to the different geographic regions. The purge command instructs those content delivery servers to delete or otherwise remove certain content from storage or cache. The purge command is complete once each of the instructed content caching delivery servers deletes the specified content and reports task completion to the administrative server.

Should one of the many servers performing the purge not receive the command, be unable to complete the command because of a software or hardware failure, or have problem reporting completion of the command back to the administrative server, the administrative server cannot deem the command as completed. The administrative server will then have to reissue the purge command or report a failure. Thus, a single point of failure within the distributed platform can degrade command execution performance for the entire distributed platform. This can further create a trickledown effect that further impacts the distributed platform performance. For instance, in the event old content cannot be completely purged from the distributed platform, the distributed platform may continue to serve obsolete content to certain users or be unable to free storage, delaying or otherwise preventing updated customer content from being served from the distributed platform.

Purge execution and command execution, in general, becomes more difficult as the distributed platform scales and deploys more servers to more PoPs, especially as the servers and PoPs are located in more distant and remote geographic regions. Such scaling introduces more execution points, each of which can become an additional point of failure or can increase delay in command execution completion. Scaling also increases the number of network hops and different transits or paths that the command signaling crosses in order to reach the servers. The network hops and transits themselves can experience different performance and failures. Such failures also slow the distributed platform's ability to execute distributed commands that implicate servers in different regions. The term "path" includes any arbitrary set of network routers or hops that are under control of a common transit provider through which a source operating within a first network can reach a destination operating within a second network. When different packets are sent from the source to the destination over a transit provider path, the packets can traverse different sets of routers or hops that are under control of the transit provider. The term "transit" refers to a specific path or a specific set of routers or hops under control of a common transit provider through which the source operating within the first network can reach the destination operating within the second network. In other words, when different packets are sent from the source to the destination over a specific transit, the packets traverse the same set or routers or hops. These terms will be used interchangeably in the following disclosure.

There is therefore a need to accelerate or improve distributed platform execution of distributed commands. Such acceleration or improvement can be obtained by reducing or resolving one or more of the variables that can degrade distributed platform performance, and specifically, the ability of the distributed platform to execute distributed commands across different servers operating in different regions. To this end, there is a need to improve the propagation of distributed commands across the distributed platform and reduce or resolve the potential for delay or failure that may occur if one or more paths carrying the command messaging between the distributed platform administrative server and PoPs become unavailable or underperform.

BRIEF DESCRIPTION OF THE DRAWINGS

A preferred embodiment of methods and systems for purging failover through application controlled path selection will now be described, by way of example only, with reference to the accompanying drawings in which.

DETAILED DESCRIPTION

Figure 1:
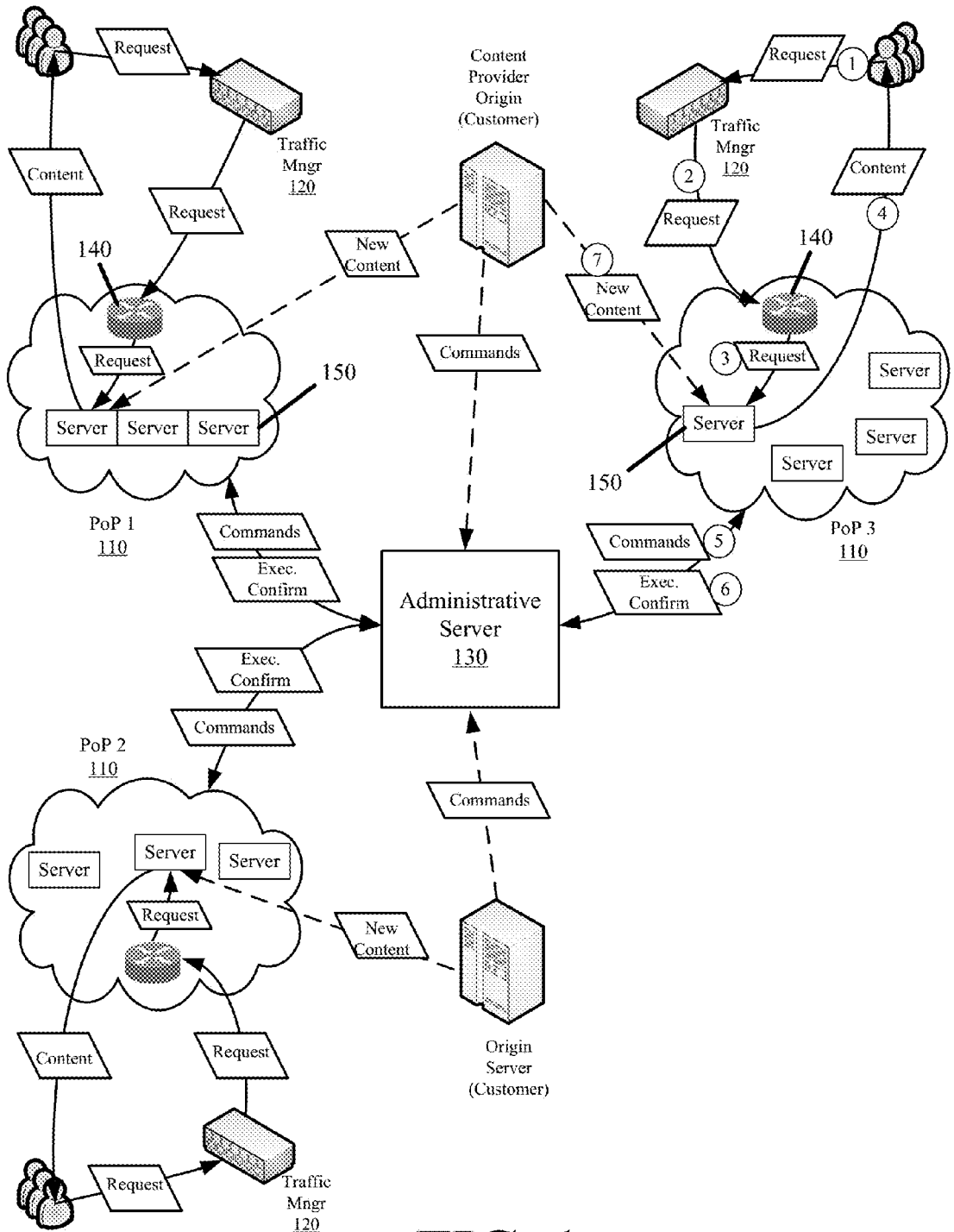
FIG. 1 illustrates an exemplary distributed platform in which the embodiments may implemented and practiced.

The embodiments set forth herein accelerate and improve command execution across a distributed platform. In some embodiments, the accelerated and improved command execution results from providing redundancy and failover for unavailable or underperforming paths (i.e., transits or paths) over which commands and other messaging pass from one distributed platform server to another. In some embodiments, the accelerated and improved command execution results from reducing the number of messaging passed over the different paths.

Some embodiments provide redundancy and failover by establishing multiple paths between at least two distant servers or points-of-presence (PoPs) of the distributed platform. To accelerate command execution over the multiple paths, some embodiments modify server operation to select between the different paths over which to issue commands and other messaging to different servers or different PoPs. The servers select between the different paths by issuing the commands using different addressing associated with each of the paths. Accordingly, if a particular server is unable to reach a particular PoP or a server of the particular PoP over a first transit provider path, the particular server can autonomously switch to a second transit provider path by changing a destination address and attempt to reach the particular PoP or server of the particular PoP using the second transit provider path. Some embodiments further accelerate command execution by modifying server operation to issue a command simultaneously over multiple paths to a destination. The destination executes the first command that arrives over the multiple paths. Subsequently arriving commands over the multiple paths can be ignored or can be redundantly executed with the redundant execution resulting in little to no additional overhead in the case of a purge.

Some embodiments reduce the amount of messaging that is passed over the different paths by modifying the manner with which the distributed platform distributes commands across the distributed platform. Rather than have an administrative server send commands to all distributed platform servers or all servers operating within the different PoPs, some embodiments modify server operation such that the administrative server sends one command to each of the PoPs with a particular PoP server receiving and distributing the command to other servers operating within the same PoP. The particular PoP server confirms the command has been executed within the PoP before messaging successful command execution back to the administrative server.

The inter-PoP and intra-PoP messaging including commands and command confirmations can be passed using a connection oriented protocol such as the Transmission Control Protocol (TCP). However, some embodiments use a connectionless oriented protocol such as the User Datagram Protocol (UDP) to send inter-PoP or intra-PoP messaging to further reduce the amount of traffic that is passed in a PoP or between PoPs.

To facilitate the discussion, FIG. 1 illustrates an exemplary distributed platform in which the embodiments may implemented and practiced. The distributed platform includes different PoPs 110, traffic management servers 120, and an administrative server 130. Such a distributed platform can embody a content delivery network (CDN) or a cloud based service provider as some examples.

The PoPs 110 are geographically separated from one another. Each PoP 110 includes at least one gateway router 140 and one or more servers 150 providing services for distributed platform customers.

In some embodiments, the PoP servers 150 are tasked with delivery of services and/or content of one or more third party distributed platform customers to end users that request the services or content from the distributed platform. To accelerate delivery of the customer content or services, the PoP servers 150 may cache or temporarily store copies of the content or services. Each PoP server 150 can represent a separate physical machine or a set of virtual machines running on a partitioned or shared set of resources of a physical machine. Multiple servers 150 may be deployed onto the hardware resources of a single physical machine.

The gateway router 140 is the point of egress for all packets the PoP servers 150 send to recipients outside the PoP 110. The gateway router 140 is also the point of ingress for all packets originating from an external network and that are directed to the PoP 110.

The traffic management servers 120 assist in accelerating distributed platform performance by routing users, and more specifically, user issued requests for services or content to one of the PoPs 110 that can optimally deliver the requested service or content back to the requesting user with least delay. Different implementations utilize different traffic management schemes, such as Anycast routing or Domain Name System (DNS) routing, to achieve such routing.

The administrative server 130 performs the command, control, and reporting function for the distributed platform. As part of this function, the administrative server 130 issues distributed commands for the various PoP servers 150 to execute. A distributed command is a command that is to be distributed across the distributed platform for execution by two or more servers operating in two or more of the distributed platform PoPs 110. A distributed command can instruct the servers 150 to load or purge certain content. The administrative server 130 further monitors distributed command execution based on confirmation messaging the PoP servers 150 send back to the administrative server 130 to signal command completion or execution. A command is complete when all servers 150 instructed to execute the command send the confirmation messaging back to the administrative server 130.

In FIG. 1, the administrative server 130 is shown as a central server of the distributed platform from which commands are distributed to the different PoPs 110. Command distribution can also be performed in a distributed manner. For example, the administrative server 130 may originally distribute a command to first and second PoPs that are closest to the administrative server 130. The first PoP can then redistribute the command to third and fourth PoPs that are closest to the first PoP and the second PoP can redistribute the command to a fifth PoP that is closest to the second PoP. Commands can be propagated in this distributed manner until all PoPs receive the command. In some such embodiments, the administrative server 130 functionality can be implemented within each of the PoPs, and more specifically, within one or more servers of each PoP 110.

Figure 2:
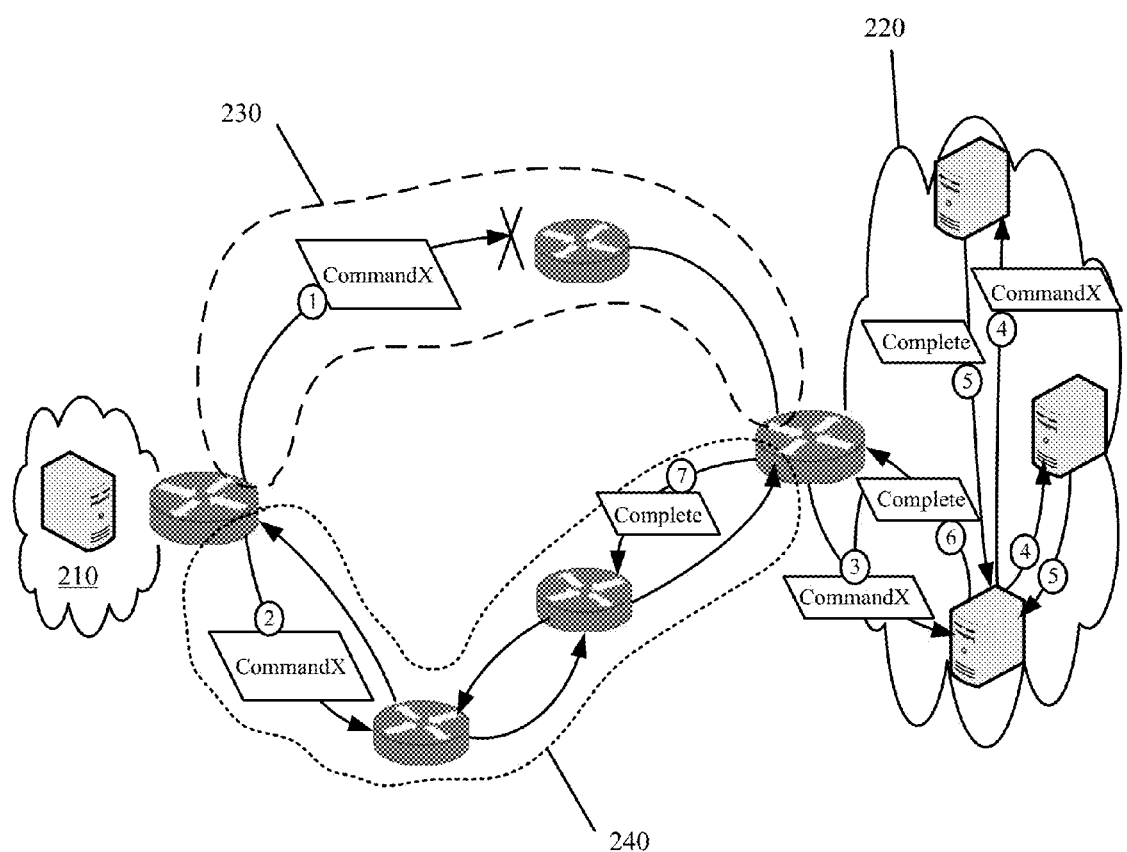
FIG. 2 conceptually illustrates accelerating and improving command execution via transit provider path failover and inter-PoP messaging reduction in accordance with some embodiments.

FIG. 2 conceptually illustrates accelerating and improving command execution via transit provider path failover and inter-PoP messaging reduction in accordance with some embodiments. The figure illustrates an administrative server 210, PoP 220, and two different transit provider paths 230 and 240 connecting the administrative server 210 to the PoP 220. The administrative server 210 can be any distributed platform server that issues a command for other distributed platform servers to execute.

The administrative server 210 initially sends a purge command to the PoP 220 over the first transit provider path 230. Due to some network failure, the PoP 220 does not receive the purge command and so no command completion response is passed back to the administrative server 210 within a specified timeout.

Once the timeout is reached, the administrative server 210 resends the purge command over the second transit provider path 240. In this case, a particular server within the PoP 220 receives the command. The particular server distributes the command to all other servers of the PoP 220 for execution. Upon executing the command and receiving execution confirmation from the other PoP servers, the particular server sends the command completion response back to the administrative server 210. The administrative server 210 receives the response from the PoP 220 within the timeout indicating that the command has been successfully processed.

Figure 3:
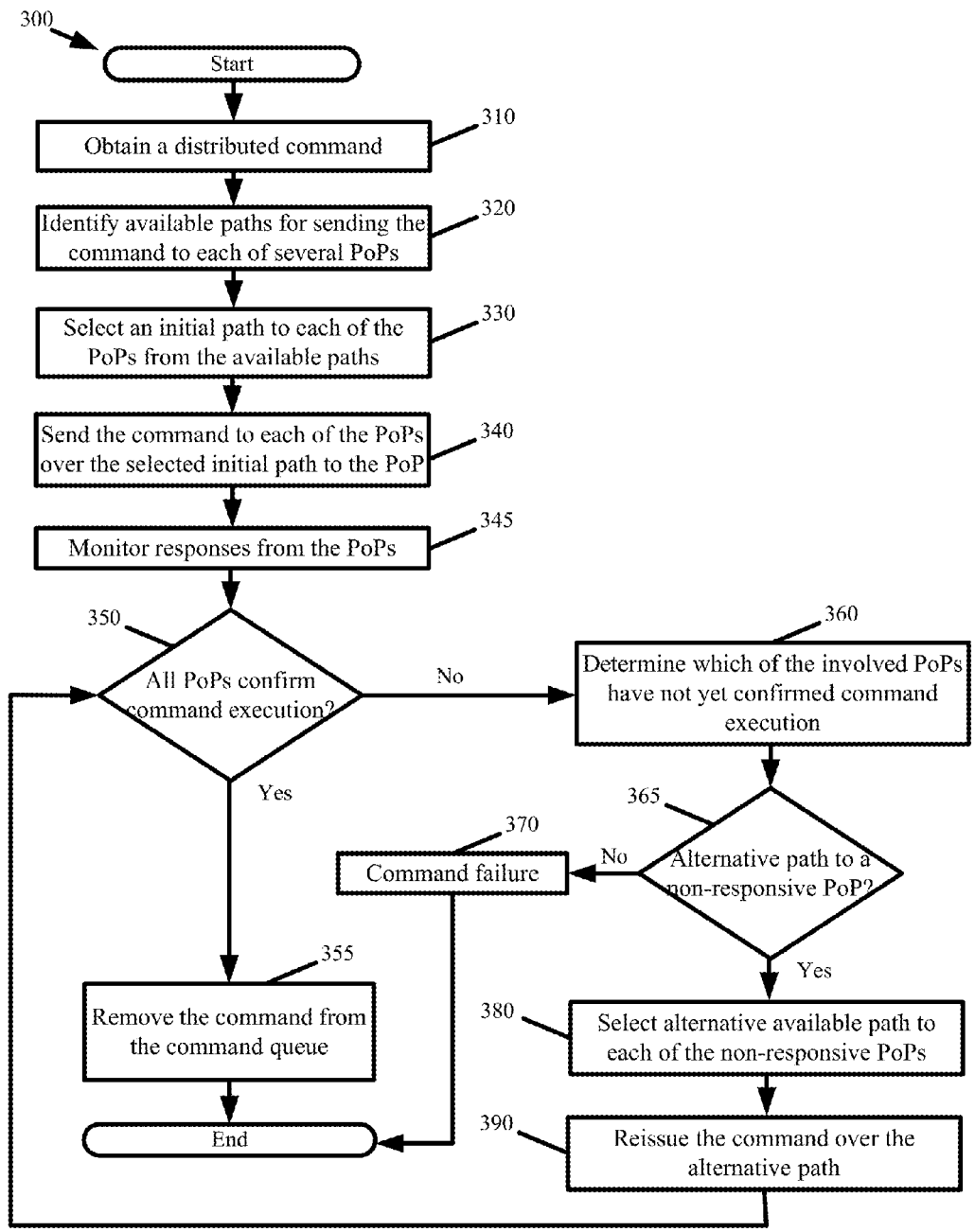
FIG. 3 presents a process for accelerating command execution using path failover in accordance with some embodiments.

FIG. 3 presents a process 300 for accelerating command execution using path failover in accordance with some embodiments. In some embodiments, process 300 is performed by a distributed platform administrative server 130. However, process 300 can be adapted so that it is performed by any distributed platform machine or server sending commands or messaging across the distributed platform for other machines or servers to execute or process.

Process 300 commences upon obtaining (at 310) a distributed purge or other distributed command from a command queue. The command can be one that is executed by a subset of the PoPs, but in most cases will be one that is to be executed by all distributed platform PoPs. Different distributed platform customers, including content and service providers, may enter the commands into the queue. These commands control or update the content and services the distributed platform PoP servers provide on behalf of the customers. Distributed platform administrators as well as maintenance processes may also enter the commands into the queue.

The process identifies (at 320) available paths for sending the command to each of the involved PoPs. These paths allow the administrative server to connect and communicate with each of the PoPs through different sets of network hops, routers, or autonomous systems as some examples. The process selects (at 330) an initial path to each of the involved PoPs from the available paths and sends (at 340) the command to each of the involved PoPs over the selected initial path to the PoP. The process then monitors (at 345) responses from the involved PoPs.

When all of the involved PoPs confirm (at 350) execution of the command before a specified timeout, the process removes (at 355) the command from the command queue as a result of the command having been completed and the process ends.

When fewer than all of the involved PoPs confirm (at 350) execution of the command before the timeout interval, the process determines (at 360) which of the involved PoPs have not yet confirmed command execution. The process determines (at 365) if at least one alternative path remains to reissue the command to each of the non-responsive PoPs. If not, the process cannot successfully complete the request and can either retry the command at a later time or signal (at 370) that the command has failed. Otherwise, the process selects (at 380) an alternative available path to each of the non-responsive PoPs and reissues (at 390) the command over the alternative path. The process reverts to step 350 and continues to issue commands over the alternative paths until all alternative paths have been exhausted or all PoPs confirm execution of the command.

Some embodiments further accelerate command execution by eliminating the delay associated with failing over from one path to another. In some such embodiments, the command issuing server distributes the command simultaneously over each of the available paths connecting the server to a desired destination.

Figure 4:
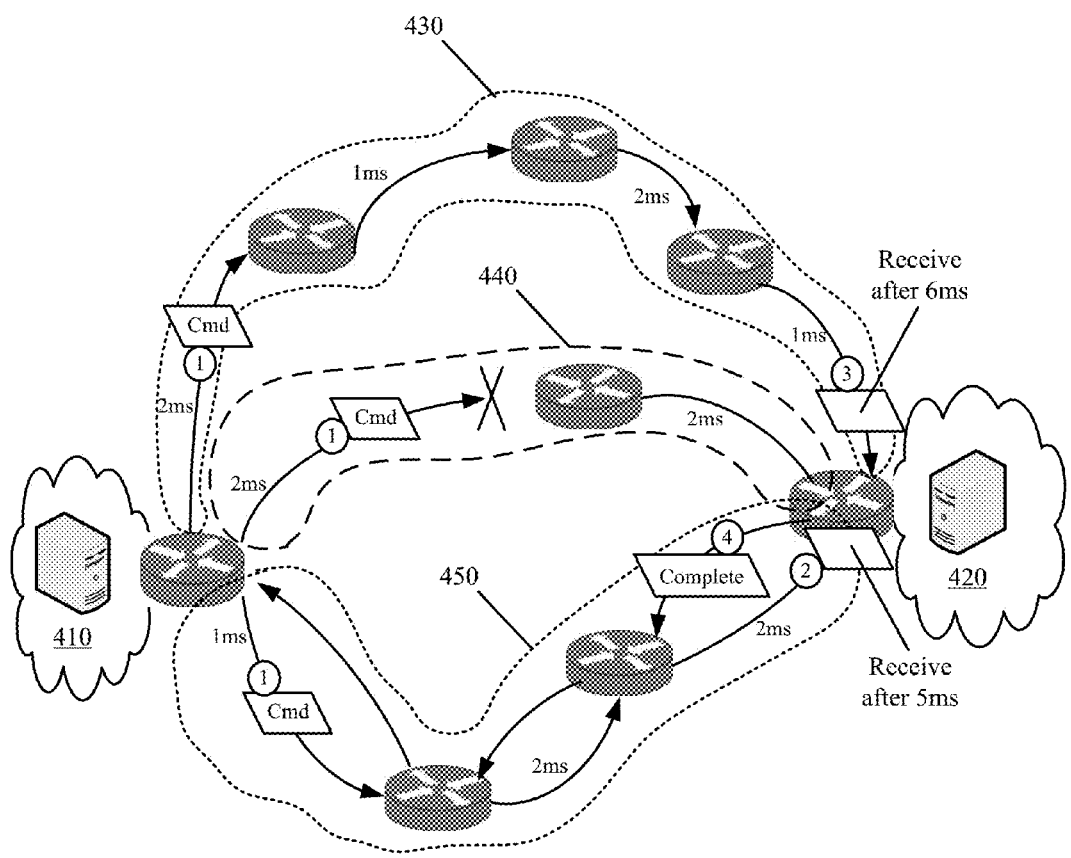
FIG. 4 conceptually illustrates accelerating command execution by simultaneously issuing a command over multiple paths to a desired destination in accordance with some embodiments.

FIG. 4 conceptually illustrates accelerating command execution by simultaneously issuing a command over multiple paths to a desired destination in accordance with some embodiments. The figure illustrates a first server 410 operating in a first PoP, a second server 420 operating in a second PoP, and first, second, and third paths 430, 440, and 450 connecting the first PoP to the second PoP. The figure also illustrates the different delays associated with each path 430, 440, and 450. These delays can change as congestion over the paths changes and as different hops or routers along the paths experience failures.

The first server 410 sends a command over the three paths 430, 440, and 450 to the second PoP. Based on the delays, the command is expected to first arrive over the second path 440. However, the second path 440 experiences a failure during the command transmission preventing the command from being delivered. Nevertheless, the simultaneous issuance of the command over the three paths 430, 440, and 450 results in the second server 420 first receiving the command over the third path 450 before redundantly receiving the command over the first path 430. Upon the first arrival of the command, the second server 420 executes the command and reports command completion back to the first PoP 410 over the third path 450 over which the command first arrived. Upon the second arrival of the command, the second server 420 can ignore the command or reexecute the command. If the command is a purge command, the reexecution results in little to no additional overhead because the identified content will have already been purged as a result of the earlier arriving command. In such cases, the command is complete without the second server 420 having remove content from storage.

Figure 5:
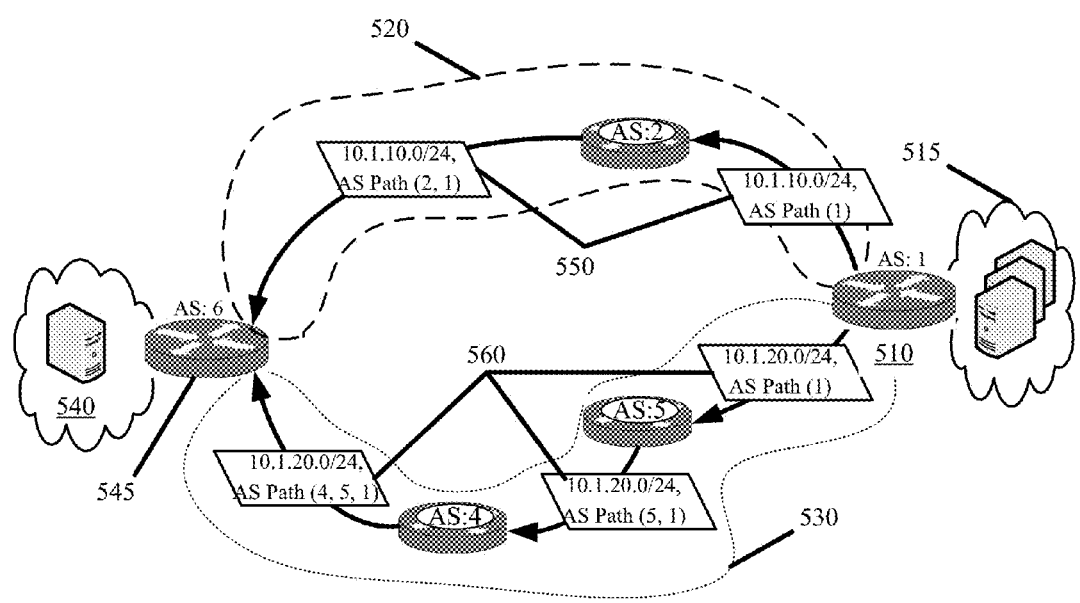
FIG. 5 conceptually illustrates assigning different addressing to different paths in accordance with some embodiments.

To facilitate path selection by the server issuing the commands across the distributed platform, the distributed platform configures different addressing for each of the paths. FIG. 5 conceptually illustrates assigning different addressing to different paths in accordance with some embodiments.

FIG. 5 illustrates different route advertisement messaging that a gateway router 510 of a particular distributed platform PoP 515 sends over each of the paths 520 and 530 connecting the particular PoP 515 back to an administrative server 540 or other server that issues commands or messaging across the distributed platform. The first path 520 traverses network hops and routers of a first autonomous system (AS) that connect the particular PoP 515 to the administrative server 540. The second path 530 traverses network hops and routers of second and third ASes that alternatively connect the particular PoP 515 to the administrative server 540.

The particular PoP gateway router 510 sends a first route advertisement message 550 over the first path 520 and a second route advertisement message 560 over the second path 530. The first route advertisement message 550 advertises that a first unique address prefix 10.1.10.0/24 is directly connected to or reachable from the particular PoP gateway router 510. The second route advertisement message 560 advertises that a second unique address prefix 10.1.20.0/24 is directly connected to or reachable from the particular PoP gateway router 510. In some embodiments, the route advertisement message is a Border Gateway Protocol (BGP) update message. In some embodiments, the route advertisement messages advertise two or more specific Internet Protocol (IP) addresses or address prefixes. The addressing can include IPv4 or IPv6 addresses.

The first and second address prefixes advertised by the particular PoP gateway router 510 point back to the particular PoP 515. Each address prefix is however advertised over only one of the different paths 520 and 530 so as to make it appear to the network routers that the path over which the address prefix is advertised is the only path to reach the advertised addresses of the address prefix.

The route advertisement messages 550 and 560 eventually propagate to the gateway router 545 of the administrative server 540. The messages 550 and 560 update the administrative server gateway router's 545 routing table, thereby altering how the router 545 routes administrative server 540 packets to the destinations identified in the messages 550 and 560. Per the route advertisement messages 550 and 560, the administrative server gateway router 545 routing table is updated to identify that the next hop for any address within the first address prefix 10.1.10.0/24 is the router in AS number 2, wherein the next hop for any address within the second address prefix 10.1.20.0/24 is the router in AS number 4. In other words, the administrative server gateway router 545 is unaware that the different address prefixes advertised in the route advertisement messages 550 and 560 received over paths 520 and 530 lead to the same particular PoP 515. The administrative server gateway router 545 only knows that the first set of addresses of the first unique address prefix (e.g., 10.1.10.0/24) are reachable through path 520 and the second set of addresses within the second unique address prefix (e.g., 10.1.20.0/24) are reachable through path 530. Therefore, if the administrative server 540 addresses the packet to an address within the second unique address prefix advertised over the second transit provider path 530, the administrative server gateway router 545 receiving the packet has only one choice or path to route the packet to. The result is that the administrative server 540 is able to usurp the path selection operation from the administrative server gateway router 545 by simply changing the destination address for the packets it sends to the different PoPs. The path selection therefore occurs without modifying the functionality of the administrative server gateway router 545.

In order to implement path selection at the administrative server 540, the administrative server 540 is provided the addressing from the route advertisements 550 and 560 sent by the PoP gateway routers (e.g., 510). The administrative server 540 maps the addresses advertised from a particular PoP to paths connecting the administrative server 540 to that particular PoP. The mapping can be a logical mapping. For example in FIG. 5, the administrative server 540 can logically map address prefix 10.1.10.0/24 to a first path to PoP 515 and logically map address prefix 10.1.20.0/24 to a second path to PoP 515. The administrative server 540 then selects a specific path to PoP 515 by entering the advertised address for the specific path as the destination address for packets directed to the PoP 515. The routers route the packets through whatever path the address prefix for the destination address was advertised.

Figure 6:
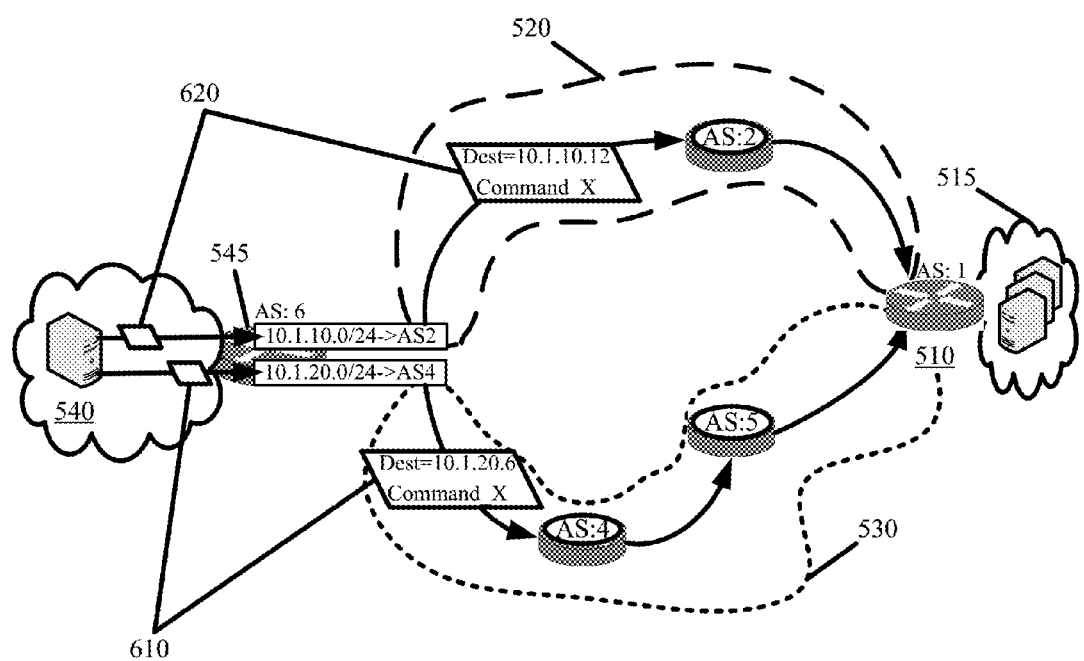
FIG. 6 conceptually illustrates the administrative server gateway router routing commands over the different paths and to the same PoP based on addressing the administrative server enters into the packets encapsulating the commands.

FIG. 6 conceptually illustrates the administrative server gateway router 545 routing commands over the different paths 520 and 530 to the same PoP 515 based on addressing the administrative server 540 enters into the packets encapsulating the commands. The administrative server 540 addresses a first packet 610 to address 10.1.20.6 that is within the second unique address prefix (i.e., 10.1.20.0/24) previously advertised from the PoP 510 over the second path 530. The administrative server 540 passes the first packet 610 to the administrative server gateway router 545. Based on the route advertisement messages previously propagated throughout the network in FIG. 5, the administrative server gateway router 545 in FIG. 6 knows that address 10.1.20.6 is reachable over the second path 530, and therefore routes the first packet 610 over the second path 530.

In FIG. 6, the administrative server 545 then addresses a second packet 620 to address 10.1.10.12 that is within the first unique address prefix (i.e., 10.1.10.0/24) advertised by the particular PoP gateway router 510 over the first path 520 in FIG. 5. In this case, the administrative server gateway router 545 knows that address 10.1.10.12 is reachable over the first path 520, and therefore routes the second packet 620 over the first path 520.

As shown in FIG. 6, the administrative server issues a single command to the PoP even though there may be many servers within the PoP that execute the command. Issuing the single command, rather than sending a command to each PoP server individually, has the advantage of accelerating and improving distributed platform command execution because it further reduces the potential for delay or loss that can occur over long haul transfers of the commands. In order to execute the single command across all PoP servers, some embodiments modify PoP server operation as well as PoP gateway router operation.

Some embodiments modify PoP gateway router operation such that when the PoP gateway router receives a packet or command addressed to a path advertised address rather than a PoP server address, the gateway router selects one of the PoP servers to receive and distribute the command. The gateway router can select the same server or perform a distribution to select a different server to receive the commands. In some embodiments, the gateway router performs a round-robin distribution of the commands across the PoP servers.

Some embodiments modify PoP server operation such that a particular PoP server receiving a command address to a path advertised address executes the command and distributes the command to the other PoP servers. The particular PoP server monitors execution of the command across the PoP and receives command execution confirmation signaling from the other PoP servers. The particular PoP servers then reports successful execution back to the administrative server when all the involved PoP servers have provided confirmation. Thus, the administrative server receives a single command execution confirmation from a PoP indicating that all servers of the PoP have executed the command rather than receiving individual confirmation from each server of the distributed platform.

Figure 7:
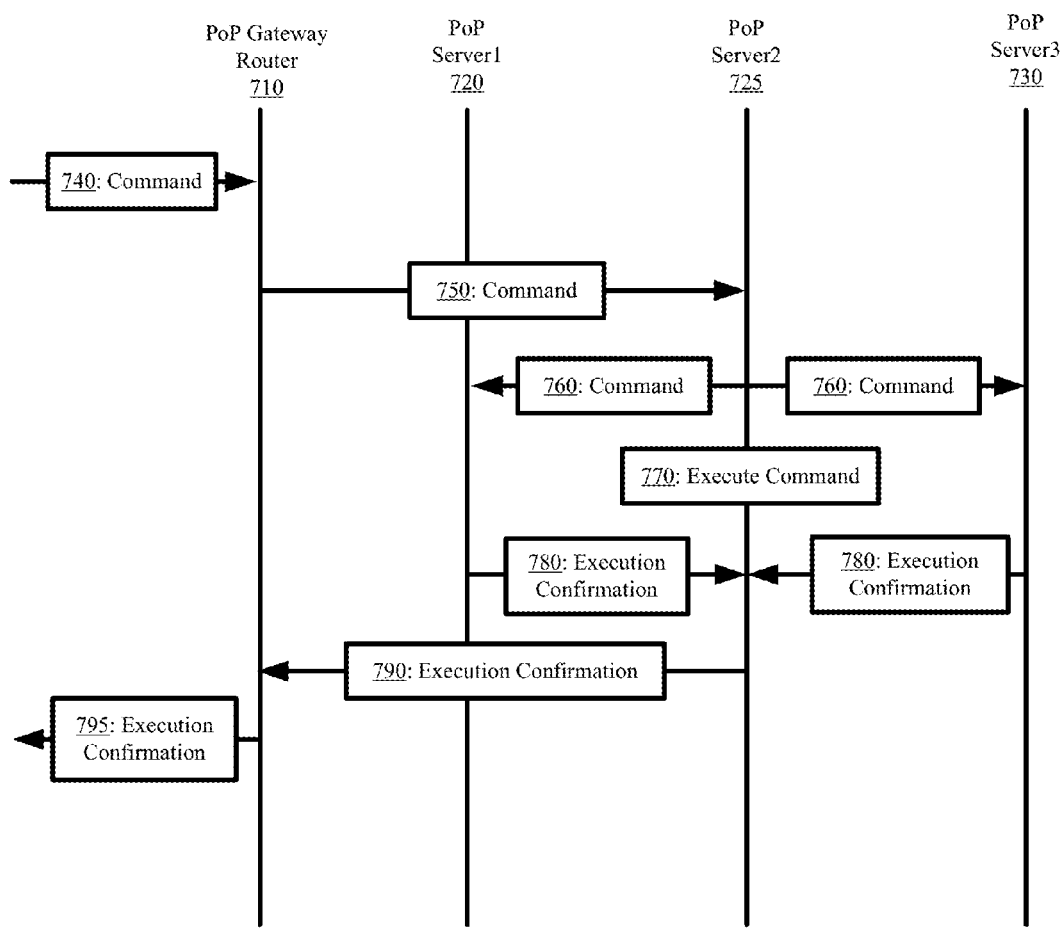
FIG. 7 presents a message exchange diagram for executing a distributed command received at a distributed platform PoP in accordance with some embodiments.

FIG. 7 presents a message exchange diagram for executing a distributed command received at a distributed platform PoP in accordance with some embodiments. The figure illustrates a gateway router 710 and multiple servers 720, 725, and 730 of the PoP.

The gateway router 710 receives (at 740) a distributed command. The gateway router 710 identifies the distributed command because the destination address is one that the gateway router 710 advertises over one of the paths connecting the gateway router 710 to the administrative server and not an address of any of the PoP servers 720, 725, and 730. The gateway router 710 uses a round-robin or other distribution to pass (at 750) the distributed command to server 725.

The PoP servers are similarly configured to recognize the distributed command based on the advertised path addressing. Server 725 identifies the distributed command and distributes (at 760) the command to all other servers 720 and 730 of the PoP for execution. Server 725 may broadcast or multicast the command to the other servers 720 and 730 or may individually address the command to each of the other servers 720 and 730.

Server 725 executes (at 770) the command and awaits confirmation from the other PoP servers 720 and 730 that they also have executed the command. Since all the servers are locally connected on a common network, the confirmations should arrive unless there is a software or hardware failure at one of the PoP servers. In the event of a failure or lack of confirmation from one or more servers within a timeout, server 725 can resend the command within the PoP or ignore the failure when the overall command execution is not impacted by the failure.

Once the other servers 720 and 730 provide (at 780) execution confirmation to server 725, server 725 sends (at 790) an execution confirmation message to the gateway router 710. The execution confirmation message is a single message indicating that all servers 720, 725, and 730 of the PoP have executed the command.

The gateway router 710 routes (at 795) the execution confirmation message back to the administrative server. In some embodiments, the gateway router 710 routes the execution confirmation message over the same path through which the command arrived at the PoP.

In some embodiments, server 725 addresses the message to the same advertised path address as was specified in the command. From the advertised path address, the gateway router 710 identifies which path to send the message back to the administrative server.

Policy based routing (PBR) rules may be configured on the PoP gateway router to enable bidirectional communication over the same path. Specifically, for any connection established between the administrative server and the PoP server, the PoP gateway router is configured with PBR rules that cause the PoP gateway router to send responses or any other messages in reply to commands and messaging sent by the administrative server over the same path or the same transit that the PoP server receives those commands or messages from the administrative server.

In some embodiments, the administrative server gateway server performed a reciprocal advertising of addresses to enable bidirectional communication over the same path. In particular, the administrative server gateway server advertises a different set of addresses over each of the paths connecting the administrative server to the different PoPs. The advertised addresses over the different path then facilitate the PoP servers and PoP gateway routers ability to return execution confirmation messaging and other messaging back to the administrative server over the same path with which the administrative server sends commands or messaging to the PoPs. In particular, the PoP servers or gateway router can map different path addressing advertised from the PoP to different path addressing advertised from the administrative server. Thereafter, the specific path address used by the administrative server to send a command over a specific path to the PoP is mapped to a corresponding path address for sending the execution confirmation message over the same specific path from the PoP to the administrative server.

Figure 8:
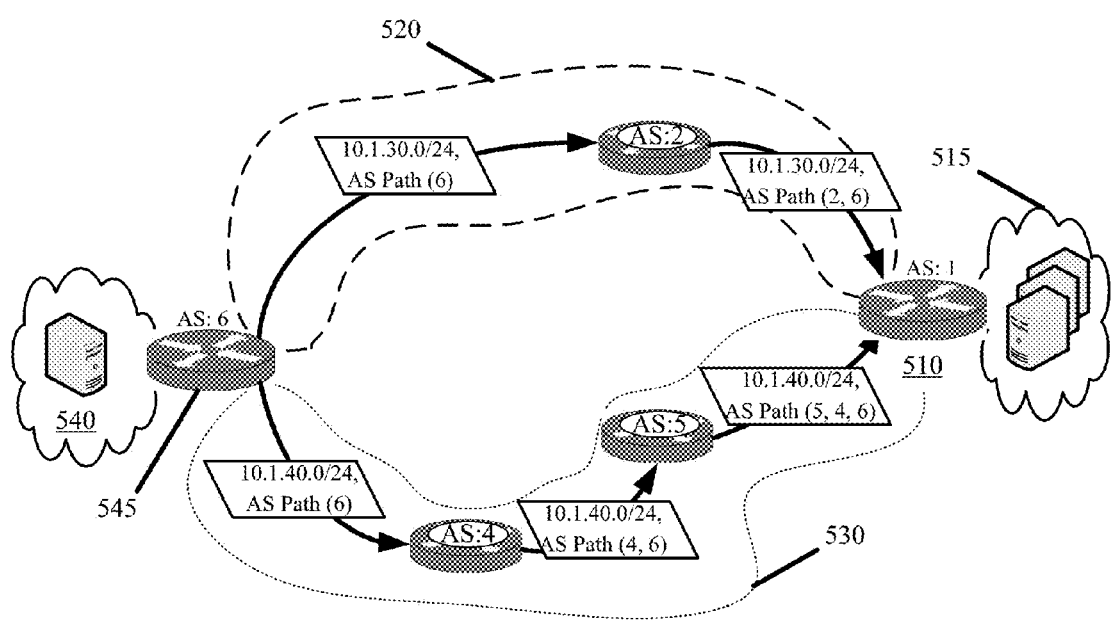
FIG. 8 illustrates the reciprocal path address advertising in accordance with some embodiments.

FIG. 8 illustrates the reciprocal path address advertising in accordance with some embodiments. As shown, the administrative server gateway router 545 sends a first route advertisement over the first path 520 and a second route advertisement over the second path 530. The first route advertisement indentifies a first address prefix that is accessible through the administrative server gateway router 545 while the second route advertisement identifies a second address prefix that is accessible through the administrative server gateway router 545. By sending these messages over the different paths, the network routers along the paths update their routing tables and route packets addressed to the different advertised addresses over the corresponding paths the addresses were advertised.

In addition to the path addressing described above, the administrative server, as well as the PoP servers, can be configured with policies for selecting between the available paths. The policies control how and which path the administrative server selects when issuing commands to the different PoPs and how to perform failover to a different path should a previously selected path be unavailable or underperform.

In some embodiments, the administrative server is configured with a default path to each PoP. The default path can be selected on the basis of cost, performance, relationship with a transit provider, or other factors. With respect to cost, different transit provider may charge the distributed platform different amounts in order to carry traffic through their paths. With respect to performance, different transit provider paths experience different amounts of traffic. The default path can change if performance across different paths varies at different times of day or on different days. Peering agreements may be established between the distributed platform and a particular transit provider. The peering agreements may cause one transit provider path to be preferable to other paths in terms of cost, performance, or other factors and may therefore be a basis from which the distributed platform selects the default path. Should the default path be unavailable or underperform, the administrative uses a round-robin distribution to reissue the command across the other available paths in some embodiments.

In some embodiments, the administrative server continually monitors the performance across each path. The administrative server determines which of the available paths to a particular PoP is the best performing at any given time based on the monitoring. The best performing path can then be selected as the default path. In some such embodiments, the administrative server monitors path performance to the particular PoP by periodically sending pings to the different path addresses advertised from the particular PoP.

Many of the above-described processes and components are implemented as software processes that are specified as a set of instructions recorded on a non-transitory computer-readable storage medium (also referred to as computer-readable medium). When these instructions are executed by one or more computational element(s) (such as processors or other computational elements like ASICs and FPGAs), they cause the computational element(s) to perform the actions indicated in the instructions. Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 9:
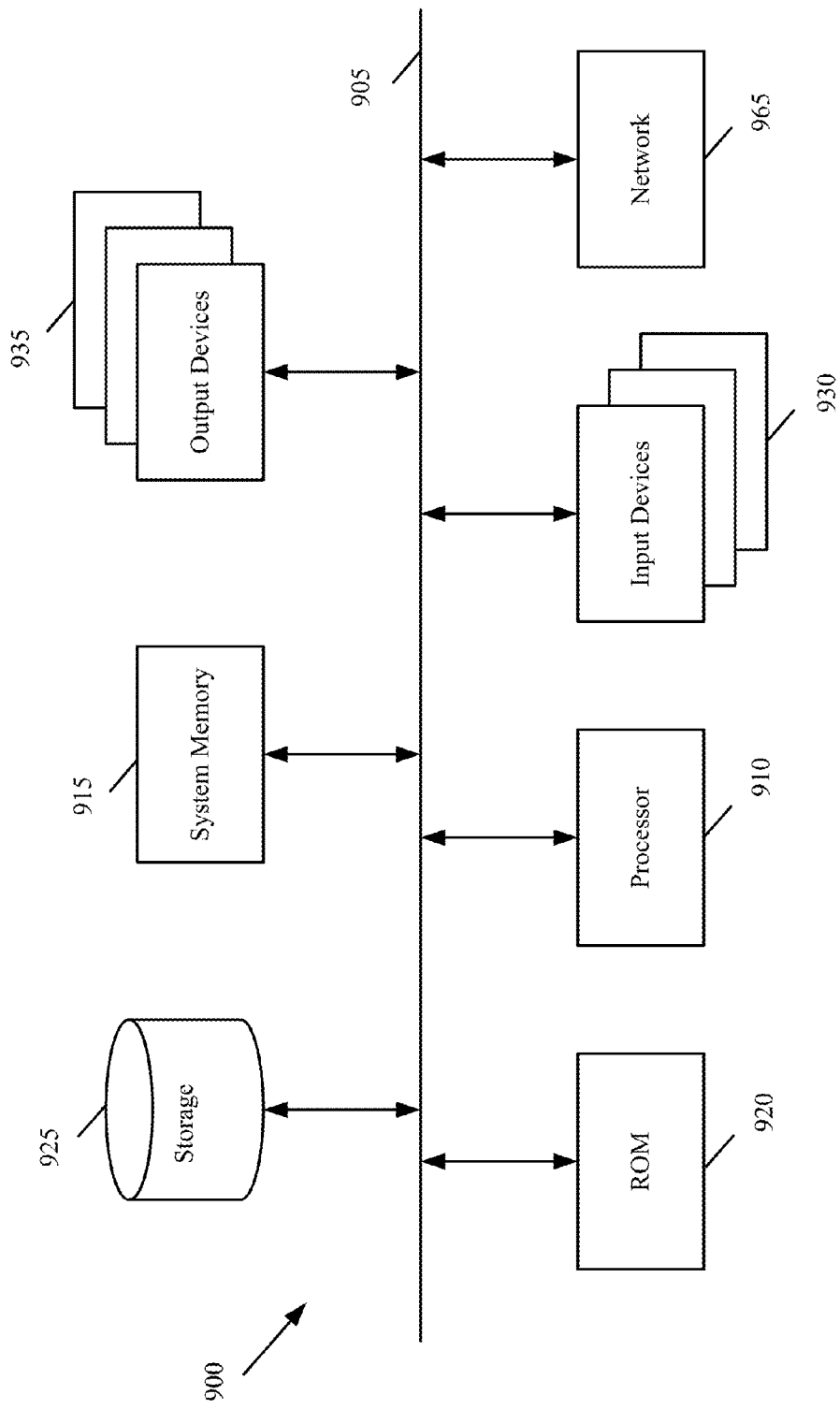
FIG. 9 illustrates a computer system or server with which some embodiments are implemented.

FIG. 9 illustrates a computer system or server with which some embodiments are implemented. Such a computer system includes various types of computer-readable mediums and interfaces for various other types of computer-readable mediums that implement the various methods and machines described above (e.g., administrative server, gateway router, PoP servers, etc.). Computer system 900 includes a bus 905, a processor 910, a system memory 915, a read-only memory 920, a permanent storage device 925, input devices 930, and output devices 935.

The bus 905 collectively represents all system, peripheral, and chipset buses that communicatively connect the numerous internal devices of the computer system 900. For instance, the bus 905 communicatively connects the processor 910 with the read-only memory 920, the system memory 915, and the permanent storage device 925. From these various memory units, the processor 910 retrieves instructions to execute and data to process in order to execute the processes of the invention. The processor 910 is a processing device such as a central processing unit, integrated circuit, graphical processing unit, etc.

The read-only-memory (ROM) 920 stores static data and instructions that are needed by the processor 910 and other modules of the computer system. The permanent storage device 925, on the other hand, is a read-and-write memory device. This device is a non-volatile memory unit that stores instructions and data even when the computer system 900 is off. Some embodiments of the invention use a mass-storage device (such as a magnetic or optical disk and its corresponding disk drive) as the permanent storage device 925.

Other embodiments use a removable storage device (such as a flash drive) as the permanent storage device Like the permanent storage device 925, the system memory 915 is a read-and-write memory device. However, unlike storage device 925, the system memory is a volatile read-and-write memory, such as random access memory (RAM). The system memory stores some of the instructions and data that the processor needs at runtime. In some embodiments, the processes are stored in the system memory 915, the permanent storage device 925, and/or the read-only memory 920.

The bus 905 also connects to the input and output devices 930 and 935. The input devices enable the user to communicate information and select commands to the computer system. The input devices 930 include alphanumeric keypads (including physical keyboards and touchscreen keyboards), pointing devices. The input devices 930 also include audio input devices (e.g., microphones, MIDI musical instruments, etc.). The output devices 935 display images generated by the computer system. The output devices include printers and display devices, such as cathode ray tubes (CRT) or liquid crystal displays (LCD).

Finally, as shown in FIG. 9, bus 905 also couples computer 900 to a network 965 through a network adapter (not shown). In this manner, the computer can be a part of a network of computers (such as a local area network ("LAN"), a wide area network ("WAN"), or an Intranet, or a network of networks, such as the Internet).

As mentioned above, the computer system 900 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:
1. A method comprising:
distributing a command over a first set of transit provider paths to a plurality of points-of-presence (PoPs) with each PoP of the plurality of PoPs comprising a different set of collocated servers;
identifying at least one particular PoP of the plurality of PoPs not providing command completion notification within a specified time in response to at least one server of the set of collocated servers of the particular PoP not providing confirmation of successful command execution;
selecting a different second transit provider path to the particular PoP; and
reissuing the command to the particular PoP over the second transit provider path.

2. The method of claim 1 further comprising receiving command completion notification within the specified time from all PoPs but the particular PoP.

3. The method of claim 1 further comprising receiving a first set of addresses advertised from the particular PoP over a first path of the first set of transit provider paths and a second set of addresses advertised from the particular PoP over the second transit provider path.

4. The method of claim 3, wherein distributing the command comprises passing the command to the particular PoP over the first path by addressing the command to an address within the first set of addresses advertised from the particular PoP over the first path.

5. The method of claim 4, wherein selecting the different second transit provider path comprises addressing the command to an address within the second set of addresses advertised from the particular PoP over the second transit provider path, and wherein reissuing the command comprises distributing the command to the second address for routing through the second transit provider path.

6. The method of claim 1 further comprising advertising at least a first address from the particular PoP to at least one router along a first transit provider path of the set of first transit provider paths and advertising at least a different second address from the particular PoP to at least one router along the second transit provider path.

7. The method of claim 6, wherein distributing the command comprises routing the command through the first transit provider path based on the command addressing the first address, and wherein reissuing the command comprises routing the command through the second transit provider path based on the command addressing the second address.

8. The method of claim 1 further comprising purging content from the set of servers operating in each PoP of the plurality of PoPs in response to said command.

9. The method of claim 8 further comprising receiving command completion notification from each PoP of the plurality of PoPs after the set of servers from each PoP successfully purges said content.

10. The method of claim 1, wherein selecting the second transit provider path comprises performing a round-robin selection from a set of transit provider paths to select the second transit provider path as a next path.

11. A method comprising:
advertising at least a first address over a first network path connecting a first server and a second server;
advertising at least a different second address over a different second network path connecting the first server and the second server;
issuing a command from the first server to the second server over the first network path by addressing the command to the first address associated with the first network path; and reissuing the command from the first server to the second server over the second network path by addressing the command to the second address associated with the second network path in response to not receiving a command confirmation message from the second server within a specified amount of time after issuing said command over the first network path, wherein the second server sends the command confirmation message in response to the second server receiving individual confirmation of successful command execution from each server of a set of servers operating in a same point-of-presence (PoP) as the second server.

12. The method of claim 11, wherein advertising the first address comprises sending a route advertisement message comprising the first address to a first adjacent router of a first autonomous system, and wherein advertising the second address comprises sending a route advertisement message comprising the second address to a second adjacent router of a second autonomous system.

13. The method of claim 11 further comprising receiving the command over the second network path by the second server and distributing the command from the second server to the set of servers collocated in the PoP with the second server.

14. The method of claim 13 further comprising monitoring at the second server, execution of the command by the set of servers.

15. The method of claim 14 further comprising sending the command confirmation message from the second server to the first server over the second network path after said monitoring identifies each server of the set of servers successfully executing said command.

16. The method of claim 11 further comprising monitoring performance over the first network path and the second network path.

17. The method of claim 16 further comprising selecting the first network path over the second network path in initially issuing the command based on said monitoring identifying the first network path having faster performance than the second network path.

18. A method comprising:
passing a command from an administrative server to a plurality of points-of-presence (PoPs) of a distributed platform, wherein each PoP of the plurality of PoPs comprises a set of servers;
receiving the command at a particular server within each PoP of the plurality of PoPs;
distributing the command from the particular server in each PoP of the plurality of PoPs to each server of the set of servers operating in the same PoP as the particular server; and
signaling successful execution of the command from each PoP of the plurality of PoPs to the administrative server in response to the particular server of each PoP receiving individual confirmation of successful command execution from each server of the set of servers operating in the same PoP as the particular server.

19. The method of claim 18 wherein passing the command comprises selecting a first transit provider path from a plurality of transit provider paths connecting the administrative server to each PoP of the plurality of PoPs and sending the command to each PoP of the plurality of PoPs over the first transit provider path to the PoP.

20. The method of claim 19 further comprising resending the command to a particular PoP of the plurality of PoPs over a second transit provider path upon the particular PoP failing to signal successful execution of the command within a specified timeout, wherein resending the command to the particular PoP comprises changing a destination address of the command from a first address that is advertised from the particular PoP over the first transit provider path to a different second address that is advertised from the particular PoP over the second transit provider path.

* * * * *